United States Patent [19]

Donahue

[11] 4,436,276
[45] Mar. 13, 1984

[54] PIN SUPPORT AND MOLD FOR FOAMING AND CURING RESIN EXTERIOR OVER BALL CORE

[75] Inventor: Gordon J. Donahue, West Henrietta, N.Y.

[73] Assignee: Voplex Corporation, Pittsford, N.Y.

[21] Appl. No.: 419,904

[22] Filed: Sep. 20, 1982

Related U.S. Application Data

[63] Continuation of Ser. No. 341,743, Jan. 22, 1982, abandoned, which is a continuation of Ser. No. 182,816, Aug. 29, 1980, abandoned.

[51] Int. Cl.³ .............................................. B29D 27/04
[52] U.S. Cl. ........................................ 249/91; 249/97; 264/46.4; 264/46.9; 264/275; 264/278; 273/65 R; 425/817 R
[58] Field of Search ................................ 249/91, 96, 97; 264/275, 278, 46.4, 46.9; 273/65 R; 425/817 R

[56] References Cited

U.S. PATENT DOCUMENTS

| 721,462 | 2/1903 | Richards | 264/328.16 X |
| 791,648 | 6/1905 | Richards | 425/405 |
| 1,624,670 | 4/1927 | Martin | 249/92 |
| 2,084,247 | 6/1937 | Dockray et al. | 249/91 X |
| 2,730,785 | 1/1956 | Williams et al. | 249/102 X |
| 3,199,829 | 8/1965 | Calim | 249/94 |
| 3,202,742 | 8/1965 | Bachelder et al. | 264/275 X |
| 3,340,342 | 9/1967 | Kane et al. | 264/275 |
| 4,067,946 | 1/1978 | Rickert | 264/278 X |
| 4,116,439 | 9/1978 | Chavarria et al. | 264/275 X |

FOREIGN PATENT DOCUMENTS

| 2125758 | 12/1972 | Fed. Rep. of Germany | 273/65 R |
| 1353603 | 5/1974 | United Kingdom | 264/278 |

Primary Examiner—Philip E. Anderson
Attorney, Agent, or Firm—Stonebraker, Shepard & Stephens

[57] ABSTRACT

Molding apparatus 10 or 11 supports a tough, resin ball core 15 in the center of a spherical mold cavity having upper and lower mold parts 12 and 13. Core 15 is about half the diameter of the mold cavity allowing room for foamed resin exterior 16 to form over and around core 15 filling the mold cavity and completing the spherical ball. A pin support 20 formed as a single pin 21 or a pair of identical pins 31 holds core 15 in the center of the mold cavity and is withdrawn after the ball is molded. The pin support is arranged at the mold parting plane and extends through the parts to the mold exterior thus providing full support and accurate location of the core within the mold cavity. A coupling element on pin support 20 is formed as a hook 28 or other engageable element outside the mold and is used for placing the core in the mold and also for supporting the ball for curing after molding.

3 Claims, 2 Drawing Figures

PIN SUPPORT AND MOLD FOR FOAMING AND CURING RESIN EXTERIOR OVER BALL CORE

RELATED APPLICATIONS

This application is a continuation of my parent application Ser. No. 341,743, filed Jan. 22, 1982, entitled PIN SUPPORT FOR FOAMING RESIN EXTERIOR OVER BALL CORE, and abandoned upon the filing of this continuation application, which parent application is a continuation of my grandparent application Ser. No. 182,816, filed Aug. 29, 1980, entitled MOLDING APPARATUS FOR FOAMING RESIN EXTERIOR OVER BALL CORE, and abandoned upon the filing of the parent application.

BACKGROUND

An excellent way to make balls for many play purposes is by foaming a resin exterior over a firm resin core. The core can be tough and heavy enough to provide the right weight and feel, and the foamed exterior can have a tough and resistant outer skin over a compressible and resilient cushion making the ball suitable for play.

The present needs of the marketplace require that such balls be made in large numbers at very low cost without sacrificing quality. My invention recognizes simple and effective ways of improving over prior art techniques in molding a foamed resin exterior over a ball core. The invention aims at low cost and efficiency in making molded balls that are durable and have suitable characteristics to perform well in play.

SUMMARY OF THE INVENTION

My inventive molding apparatus foams a spherical resin exterior over a ball core that is about half the diameter of the exterior. A two-part, generally spherical mold has a pin support at the mold parting plane that concentrically supports the core within the mold and bridges the cavity between the core and the mold. The pin support is surfaced in the cavity region for withdrawal from the ball after molding. The pin support fits snuggly in the mold parts at the parting plane and extends completely through the mold parts to their exterior. A locator engaging the mold exterior locates the pin support and the core within the mold, and a coupling element outside the mold is used to place the core in the mold and later supports the ball for curing.

DRAWINGS

FIG. 1 is a partially schematic, vertical cross-sectional view of a preferred embodiment of molding apparatus for making balls according to the invention; and FIG. 2 is a partially schematic, vertical cross-sectional view of another preferred embodiment of the inventive molding apparatus.

DETAILED DESCRIPTION

Figure 1:
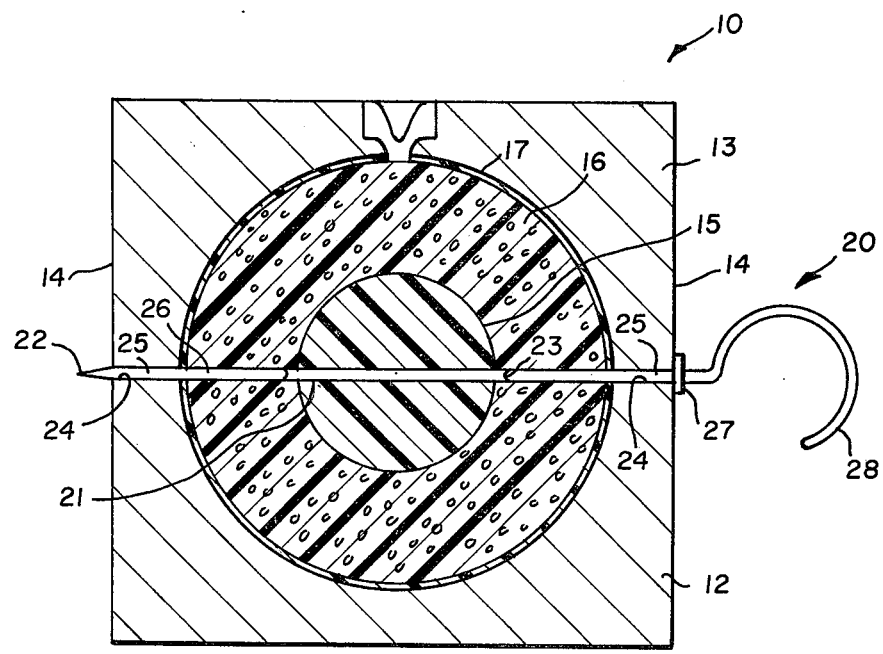

My molding apparatus 10 or 11 supports a ball core 15 within the cavity of a mold having lower and upper mold parts 12 and 13 respectively. The mold cavity is spherical, and core 15 is supported in the center of the mold cavity as a foamed resin exterior is formed over and around core 15 to complete a molded spherical ball. My invention involves mostly a pin support system to make such an operation practical and efficient.

Core 15 can be formed by many materials, but is preferably formed of a tough and firm solid resin material giving the finished ball body and weight. Core 15 is about one-half the diameter of the mold cavity and the finished ball to allow ample room for foamed resin to flow around core 15 as it rises and fills the mold cavity.

Foamed resin 16 can also be formed of many different materials to form a suitable resilient exterior for the molded ball. Foamed resin 16 is preferably formed with a tough outer skin 17 that is denser, less porous, and forms a durable outer cover for the molded ball. Skin 17 can be formed in generally known ways by properly selecting resin materials, molding parameters, and mold cavity coatings.

In the embodiment of FIG. 1, a single pin support 20 supports core 15 in the center of the mold cavity; and pin support 20 has several characteristics that make this workable. Pin support 20 includes a long straight pin 21 that is preferably cylindrical in cross section and has a uniform diameter extending between opposite mold exteriors 14. Pin 21 can also be tapered or have a cross section other than circular and preferably has a pointed end 22. Pin 21 skewers through core 15, which has a diametrical bore hole or opening to receive pin 21. A locator mark 23 on pin 21 is useful for positioning core 15 properly along the length of pin 21 so that core 15 is centered within the mold cavity when pin support 20 is positioned within mold parts 12 and 13.

Pin 21 is arranged in the parting plane between mold parts 12 and 13, and diametrically opposed bore holes 24 through mold parts 12 and 13 at the parting plane receive pin 21 in a snug fit. Extending pin 21 for the full width of mold parts 12 and 13 provides maximum support for pin 21 between the mold parts and pin 21 has a uniform cross-sectional shape in the regions 25 where it extends snugly through bore holes 24. This allows pin 21 to be very thin and still be strong enough to support core 15 within the mold cavity.

Throughout the region 26 where pin 21 extends along the diameter of the mold cavity and core 15, pin 21 is surfaced for easy removal from the molded ball. A release coating, taper, or both, assure easy withdrawal of pin 21 from the molded ball, leaving two acceptably small marks at the surface of the finished ball.

Pin support 20 has a collar 27 providing a locator stop that abuts against the exterior 14 of mold parts 12 and 13 and locates pin 21 and core 15 accurately relative to the mold cavity. There are many alternatives to stop collar 27, including cross pins, bends, enlarged diameters, and other configurations that can engage mold exterior 14 and locate pin support 20 relative to the mold cavity.

Pin support 20 also has a coupling element 28 formed as a hook disposed outside the mold for convenient engagement during molding operations. Hook 28 can be used to hang up the molded ball to cure after molding and also forms an engageable element that can be used for placing pin support and core 15 properly in place within the mold. Hook 28 or other coupling element can cooperate effectively with automatic equipment both for placing core 15 within the mold and supporting the molded ball to cure.

Figure 2:
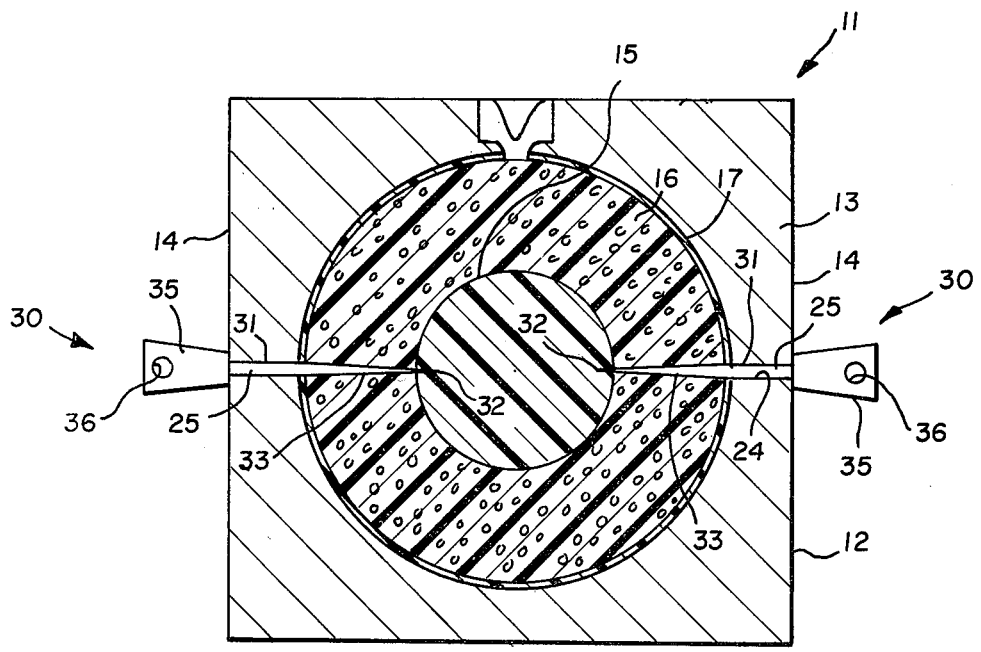

The embodiment of FIG. 2 shows a pin support 30 using a pair of identical pins 31 that penetrate core 15 and support it within the mold cavity. Pins 31 each have preferably cylindrical and uniform sized bodies 25 extending throughout the length of bore holes 24 between mold parts 12 and 13 for firmly supporting pins 31 in the mold. Within the mold cavity, pins 31 taper to points 32 that penetrate and support core 15. Tapers 33 on pins 31 also facilitate withdrawal of pins 31 from the molded ball, and tapered surfaces 33 can be covered with a release coating. Pin points 32 can be driven mechanically into core 15 at opposite ends of a diameter to a sufficient depth in support core 15 within the mold cavity.

Pins 31 have heads 35 that abut against and engage the exterior 14 of mold parts 12 and 13 to locate pins 31 and core 15 accurately relative in the mold cavity. Heads 35 also provide coupling elements disposed outside the mold and engageable for supporting a molded ball for curing and automatically placing pins 31 and core 51 properly within the mold. Heads 35 can have many different shapes for these purposes and are shown with holes 36 to illustrate one possibility.

With either of the preferred embodiments, a pin support is properly connected to a core and easily positioned within the mold to center the core within the mold cavity so that the exterior of the ball can be formed of foamed resin. The pin supports can then be used to remove the ball from the mold cavity and hang it or hold it for curing after which the support pins are readily withdrawn with the aid of tapers or release coatings. Use of pin supports for molding balls according to the invention is fast, efficient, and reliable so that serviceable balls can be made in large quantities at low cost.

I claim:

1. A pin support and mold for foaming and curing a spherical resin exterior over a spherical ball core that is about one-half the diameter of said resin exterior, said pin support and mold comprising:
   a. a two-part mold having a spherical cavity and a mold parting plane intersecting the center of said spherical cavity;
   b. a bore hole extending through said mold parts at said mold parting plane, the axis of said bore hole being oriented to pass through said center of said spherical cavity;
   c. a pin support including a straight shaft extending through a diameter of said core;
   d. said shaft fitting snugly within said bore hole and extending for the length of said bore hole from one exterior side of said mold to an opposite exterior side of said mold to support said core within said spherical cavity;
   e. said shaft having a locator abutment arranged to engage one of said exterior sides of said mold to locate said shaft axially relative to said mold exterior and thus locate said core within said spherical cavity;
   f. said pin support extending outward beyond said locator abutment away from said engaged exterior side of said mold;
   g. said outward extension of said pin support being formed as a coupling element disposed outside said mold;
   h. said pin support being arranged so that, without moving said pin support, said mold parts can be separated when said foamed spherical resin exterior is partly cured, and said pin support can be moved clear of said mold to move said ball clear of said spherical cavity; and
   i. said coupling element being shaped for hanging up said shaft to support said ball for curing in air out of contact with other surfaces for a curing time following molding of said resin exterior over said core.

2. The pin support and mold of claim 1 wherein said coupling element is formed as a hook.

3. The pin support and mold of claim 1 including a locator mark on said shaft for determining the position of said core on said shaft.

* * * * *